United States Patent [19]

Bigorre

[11] 4,069,597
[45] Jan. 24, 1978

[54] QUESTION AND ANSWER GAME

[76] Inventor: Gaston Bigorre, 107 rue de Chartres, Bonneval, France, 28800

[21] Appl. No.: 675,248

[22] Filed: Apr. 9, 1976

[30] Foreign Application Priority Data

Apr. 11, 1975 France .................................. 75.11434

[51] Int. Cl.² .............................................. G09B 7/06
[52] U.S. Cl. ...................................... 35/9 C
[58] Field of Search ......................... 35/9 B, 9 C, 9 D

[56] References Cited

U.S. PATENT DOCUMENTS

| | | | |
|---|---|---|---|
| 2,860,422 | 11/1958 | May ........................................ | 35/9 C |
| 2,889,634 | 6/1959 | Bringmann ............................ | 35/9 C |
| 3,015,895 | 1/1962 | Stall ...................................... | 35/9 D X |
| 3,106,784 | 10/1963 | Raley .................................... | 35/9 C |

Primary Examiner—William H. Grieb

[57] ABSTRACT

A question and answer game comprising a plurality N of normally open electrical contact devices distributed on a board, each device having an identifying reference. An indicator device is controlled by an electrical system which interconnects in a predetermined manner at least some of the N contact devices in order to establish $n$ different combinations each comprising at least $p$ series connected contact devices ($p$ being greater than two) the closure of which causes the actuation of the indicator device.

A plurality of questionnaires are also provided which have coded answers which each correspond to one of the aforesaid combinations, and removable connection means may be used to select the answer by closing the contact devices whose references correspond to the answers supplied to the said questionnaires.

13 Claims, 3 Drawing Figures

QUESTION AND ANSWER GAME

The present invention relates to question and answer games.

Question and answer games currently on the market generally comprise a board supporting a first series of electrical contact members, associated with which is a corresponding series of questions, and a second series of electrical contact members, associated with which is a corresponding series of answers, the game consisting of electrically connecting one of the contact members of a question to the contact member of the corresponding correct reply by means of a flexible lead in order to close a circuit for actuating a light or sound indicator device.

Games of this type, although instructive, have the drawback that the user quickly learns to recognise the associated pairs of contacts controlling the actuation of the indicator device.

The object of the present invention is the provision of a question and answer game which does not have this drawback and which, for a given number of associated pairs of contact members, also has more possibilities of application than prior games of the above type.

More precisely, the invention relates to a question and answer game comprising a plurality N of normally open electrical contact devices distributed on a board, each device having an identifying reference, an indicator device, an electrical system which interconnects in a predetermined manner at least some of the N contact devices in order to establish $n$ combinations each comprising at least $p$ series connected contact devices ($p$ being greater than two) the closure of which causes the actuation of the indicator device, a plurality of questionnaires having coded answers which each correspond to one of the aforesaid combinations, and removable connection means for closing those contact devices whose references correspond to the answers provided in the said questionnaires.

According to a preferred arrangement, the board is constituted by a thin insulating panel provided with a plurality of N identical recesses each bearing a reference. The electrical system comprises an arrangement of flat pre-cut leads arranged on the same side of the board, each flat lead extending across a plurality of the recesses in the board in order to define an area of contact.

The invention will be better understood on reading the ensuing description which refers to the accompanying drawings, given solely as an example, and in which.

Figure 1:
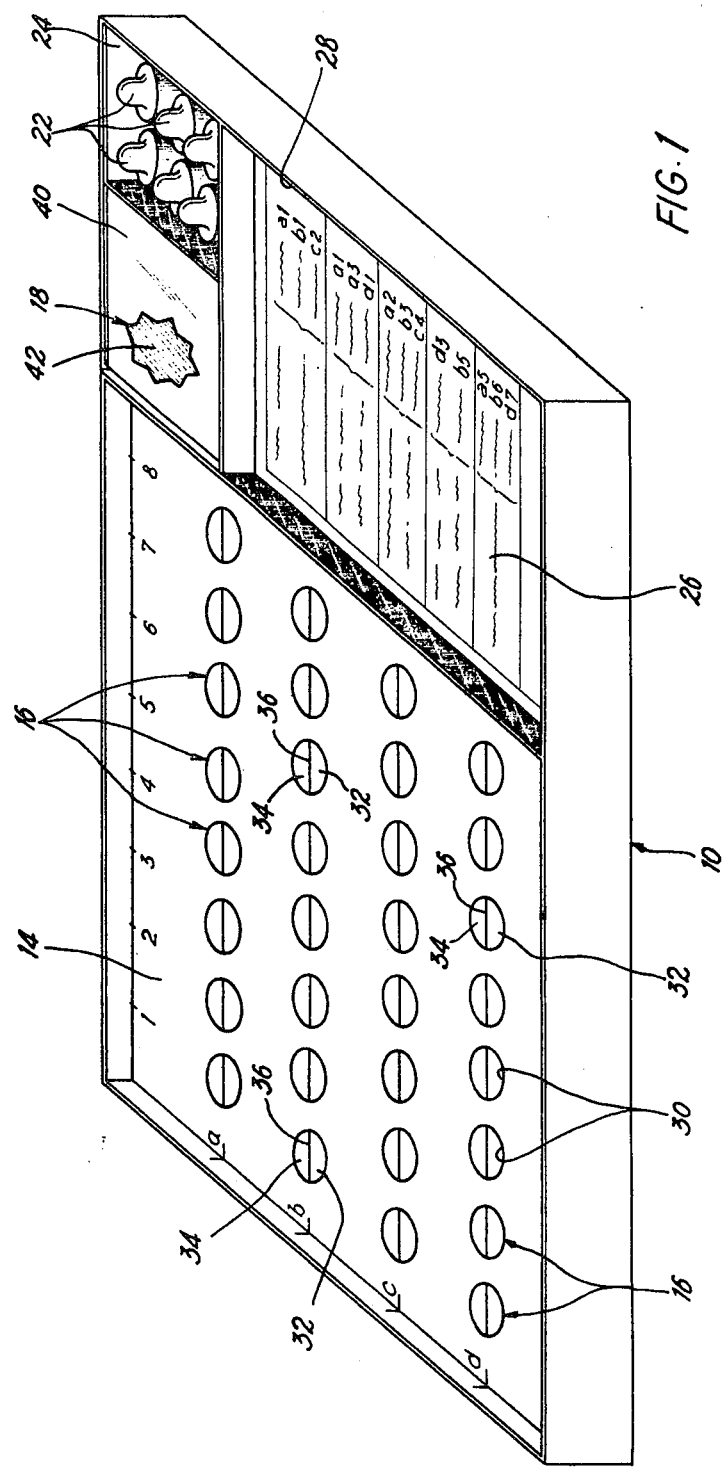
FIG. 1 is a general perspective view of a question and answer game according to the invention.

In FIG. 1, the reference numeral 10 designates a box of rectangular shape, in which is housed a question and answer game according to the invention. This game comprises essentially four main components namely:

1. A rectangular playing board 14 supporting a number N of open electrical contact devices 16 preferably located on the board 14 in an arrangement of lines and columns.

2. A light or sound indicator device 18, whose actuation is controlled by an electrical system 20 (see FIG. 2) interconnecting at least part of the contact devices 16 on the board 14, in a predetermined manner.

3. A set of connection means 22 located in a housing 24 in the box 10 and each intended for closing one of the contact devices 16 chosen by the player and 4. A plurality of indices 26 housed in a rectangular compartment 28 of the box 10 and each receiving one or more questionnaires to which the player must reply correctly in order to win.

The board 14 is preferably made as a thin panel of insulating material, such as cardboard or a rigid plastics mateial, appropriately retained in the box 10. This panel 14 comprises a number N of circular recesses 30, associated with each of which is a contact device 16. In the embodiment illustrated, N is equal to 32, the recesses 30 being distributed uniformly in four lines and eight columns. Each recess 30 has a specific reference which may advantageously be constituted by a reference comprising two signs (letters, numbers etc.), whereof the first designates the line corresponding to the recess in question and the other the column. In the example of FIG. 1, the lines are referred to by small letters ($a$, $b$, $c$ and $d$) and the columns by numbers (1, 2, 3, 4 ... 7 and 8). However, it will be understood that any other reference system could be used. In the case where N is equal to 40, one could thus envisage a purely numerical system in which the lines would successively represent the units, tens, hundreds, thousands etc. and the columns the significant figures 1, 2, 3 ... 8, 9 and 0. A four figure number would thus correspond to each of the forty recesses. Each recess 30 could thus be referred to by particular signs, such as names, colours, drawings etc., the arrangement of the recesses of the panel 14 being able to differ from that which is shown.

As explained hereafter, each contact device 16 comprises two adjacent conducting areas 32 and 34 separated by a space such as a slot 36 ensuring the opening of the electrical connection between the two areas 32 and 34. The contact device 16 is thus "open." The areas 32 and 34 are arranged on the inner side of the panel 14 such that only a portion of these areas is visible from outside through the recess 30 corresponding to the device 16 in question.

With such an arrangement of areas 32 and 34, it will be understood that the closure of each contact device 16 may be obtained very easily by connection means such as a metal stud or plug 22 able to be placed astride the two areas 32 and 34.

The formation of two conducting areas for each device 16 is only a preferred embodiment. More generally, one could also envisage for each device 16, two contact members which are relatively adjacent but insulated electrically and able to be connected by an appropriate connecting member (rider, plug, small bar etc.).

The connection means 22 are each preferably constituted by a stud of magnetised material, in order to be retained on the areas 32 and 34 of the device 16 chosen, by a magnetic force resulting from the attraction of the magnetised stud towards a ferromagnetic support (not shown) located below the areas 32 and 34. This support may be constituted by a simple plate made of steel sheet arranged immediately below these conducting areas (and insulated electrically from the latter). This support could also be constituted by the areas 32 and 34 themselves, in the case where the latter are obtained by cutting out a thin steel sheet.

In the embodiment of FIG. 1, the indicator means 18 is constituted by a lamp (not shown) located below a window 38 provided in a panel 40 and covered by a transluscent or transparent wall 42. The panel 40 is advantageously removable to facilitate the introduction of a dry battery or any electrical supply source (not shown) intended for actuating the indicator means 18.

Each of the indices 26 comprises one or more questionnaries.

According to a first possibility, each of the latter comprises a number $p$ of different questions ($p$ is greater than or equal to 3), corresponding to each of which are at least two coded answers, only one of these answers being correct. The code which is assigned to each answer corresponds to one of the references assigned to the devices 16. Thus the player answers the question posed, by placing a stud 22 in the recess 30 whose reference corresponds to the answer which he assumes is correct, thus causing closure of the corresponding contact device 16.

According to a second possibility, each of the questionnaires comprises a single question, to which there are at least $p$ possible answers, from a choice of $q$ proposed coded answers ($q$ being greater than $p$). The player places $p$ studs in the recesses 30 whose references correspond to $p$ answers selected by him.

The two above proposed possibilities of using the game may be combined in the same questionnaire.

It will be understood that it is possible to imagine other possibilities for using the game, each index may thus comprise a narative containing a certain number of true or false propositions. These propositions are coded and it is necessary to select the $p$ propositions which are false. In the above-mentioned variation, where the recesses 30 have purely numerical references, it is also possible to propose in each questionnaire, a mathematical operation whose result in units, tens, hundreds and thousands will be directly displayed on the board 14.

Essentially, by means of the questionnaire, the player has to re-compose the combination of $p$ different predetermined references from a possible choice of $Q$ references proposed, in order to close a predetermined combination of $p$ contact devices and thus control the actuation of the device 18, as explained hereafter.

Figure 2:
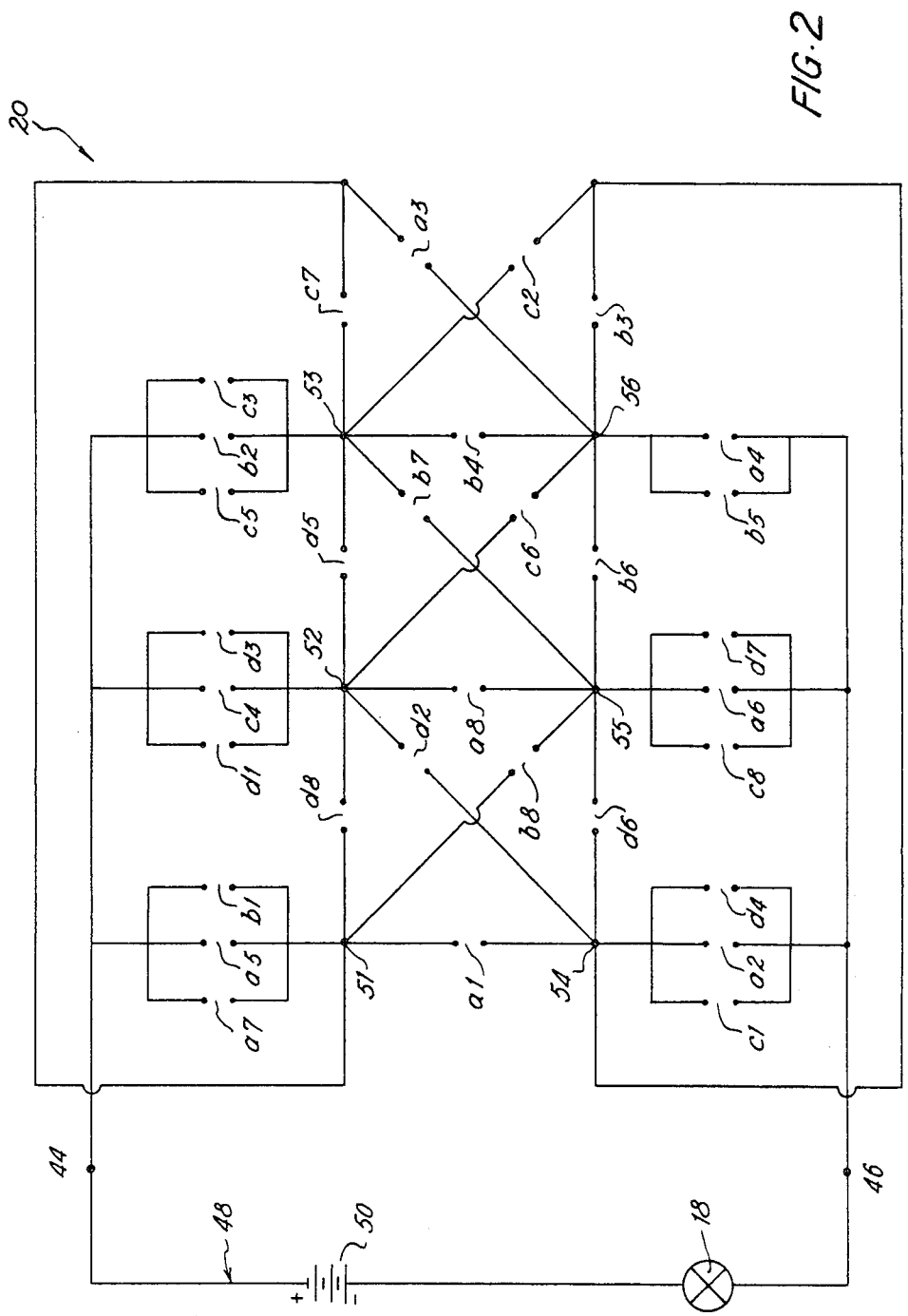
FIG. 2 is a diagrammatic view of an electrical system which may be used with the game of the invention.

The contact devices 16 are interconnected, at least for the most part (certain devices may be completely insulated and, due to this, have no electrical function) by an appropriate electrical system 20, whereof a possible example is illustrated in FIG. 2. The essential object of this system 20 is to allow the establishment on $n$ different combinations comprising at least $p$ separate contact devices 16, arranged in series, whose closure by connection means 22 causes the closure of the electrical connection between the two end terminals 44 and 46 of a circuit 48 incorporating with the indicator device 18, an electrical supply source 50, such as the dry battery envisaged above.

The system 20 of FIG. 2 is composed of a combination of loops, whose sides each comprise an open contact device. In FIG. 2, these devices are designated by their respective references. More precisely, the system 20 of FIG. 2 comprises six central nodes 51, 52, 53 ... 55 and 56 which are each connected firstly to the terminal 44 (for the nodes 51, 52 and 53) or the terminal 46 (for the nodes 54, 55 and 56) by means of one or more connections each incorporating a contact device 16 and secondly to four other nodes by overlapping connections each incorporating a contact device. With 32 contact devices, it is thus possible to connect the terminals 44 and 46 in 1080 ways, by closing the contact devices corresponding to the connections which it is desired to use. In other words, the system 20 of FIG. 2 makes it possible to establish 1080 combination of $p$ separate contact devices, $p$ being equal to 3, 4 or 5.

The system 20 of FIG. 2 constitutes solely a possible example of other simpler or more complex systems, depending on the requirements of the game.

Figure 3:
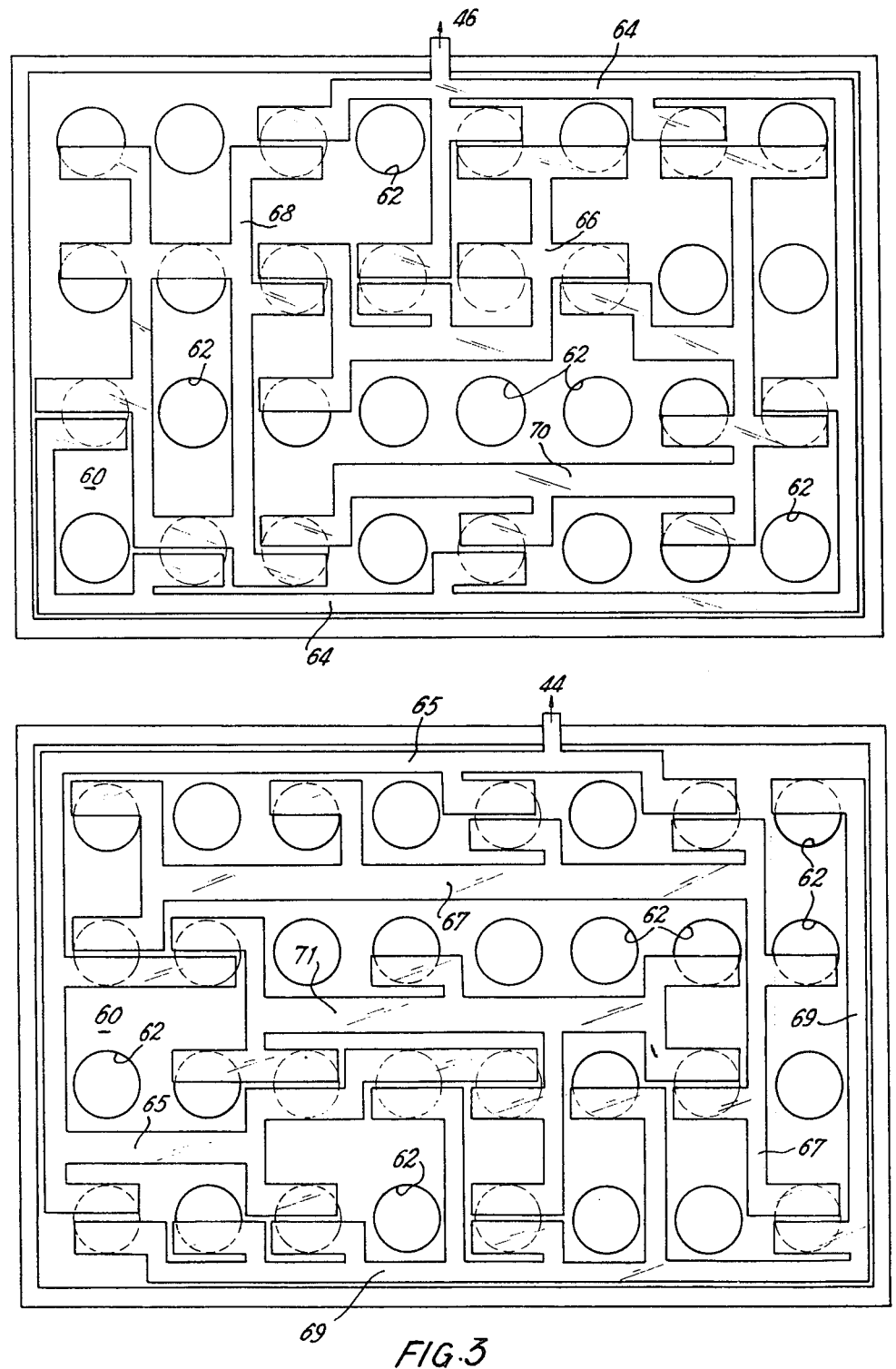
FIG. 3 is a front and rear plan view illustrating a preferred embodiment of the system of FIG. 2.

FIG. 3 shows a particularly advantageous embodiment of the system 20 of FIG. 2. This embodiment consists of locating on either side of a thin insulating support 60 provided with N openings 62 arranged in a similar manner to the recesses 30 of the board 14, a plurality of flat pre-cut leads 64, 66, 68 and 70 for the front side and 65, 67, 69 and 71 for the rear side. Each flat lead forms a certain number of conducting areas (32 and 34) of the devices 16 at the same time as the electrical connections between the latter. Reference should be made to the drawing of FIG. 3 for the shape of the cut out of the leads 64 to 71 in the case of 32 contact devices and a number of 1080 possible combinations of $p$ devices for closing the connection between the terminals 44 and 46.

In a variation (not shown) the flat leads are arranged directly on the inner side of the board 14, the thin support 60 being eliminated. Naturally, the electrical system provided is different from that of FIG. 3 and the number $n'$ of possible combinations causing the connection of the terminals 44 and 46 is less than the preceding number $n$ (1080).

The insulating support 60 need not be perforated, the flat leads being fixed by glueing them for example on the upper face of the support 60 to form a type of printed circuit. In such an arrangement, the flat leads would preferably be of a ferromagnetic material.

It will be understood that the invention is not limited to the embodiments described and illustrated above and that numerous modifications may be made within the scope of the invention as defined in the appended claims.

What is claimed is:

1. In an educational game, comprising:
   a signalling device having two terminals and being operated when a conducting path connects said two terminals,
   a plurality of electrically conducting lines connected across said two terminals, and being interrupted at cut-off regions thereof, said cut-off regions being related to respective statements of the educational game, a group of cut-off regions which are in series on the same conducting line defining a correct group of statements, and
   contacting means adapted to be selectively brought into contact with any one of said cut-off regions so as to establish an electrical path thereacross, thereby constituting the selection of the statement associated with the corresponding cut-off region,
   the improvement being said electrically conducting lines having:
   a first end portion comprising at least two first cut-off regions, one side of which is connected in common to one of said terminals, and the other sides of which define a first group of at least two central nodes, respectively;
   a second end portion comprising at least two second cut-off regions, one side of which is connected in common to the other of said terminals, and the other sides of which define a second group of at least two central nodes, respectively; and intermediate cut-off regions being interconnected between themselves and with the central nodes of the said first and second groups thereof, the interconnection being such that no central node of the first group be directly connected to a central node of the second group, and that there is at least one path via intermediate cut-off regions between two central nodes belonging to the same one of said first and second groups thereof.

2. The educational game of claim 1, wherein certain of the intermediate cut-off regions are connected on one side thereof to a central node of said first group, and on the other side thereof to a central node of said second group.

3. The educational game of claim 2, wherein certain of the intermediate cut-off regions are connected on one side and on the other side thereof the different central nodes belonging to the same group.

4. The educational game of claim 3, wherein each central node in at least one of said first and second groups thereof is connected to all the central nodes of the same group across one or more intermediate cut-off regions.

5. The educational game of claim 4, wherein the central nodes in one of said first and second groups thereof are interconnected across intermediate cut-off regions, which form a closed path passing at all the central noeds of said group.

6. The educational game of claim 5, wherein the central nodes in the other of said first and second groups thereof are also interconnected across intermediate cut-off regions, which form a closed path passing at all the central nodes of said other group.

7. The educational game of claim 1, wherein each central node of one of said groups is connected across intermediate cut-off regions to at least two central nodes of the other one of said groups.

8. The educational game of claim 1, wherein at least certain of the cut-off regions include a plurality of open-circuit regions connected in parallel.

9. The educational game of claim 1, wherein each cut-off region comprises on a board two separate adjacent plane contact areas electrically connectible by a removable metllic member constituting one of the aforesaid contacting means.

10. The educational game of claim 9, in which each metallic member is constituted by a stud of magnetized material retainable by magnetic force in contact with said two contact areas after having been placed thereon.

11. The educational game of claim 9, in which the electrical network is formed on a printed circuit.

12. The educational game of claim 9, in which the board is constituted by a thin insulating panel provided with a plurality of N identical recesses each having a reference, and in which the electrical system comprises an arrangement of flat pre-cut leads arranged on the same side of the board, each flat lead extending across a plurality of the recesses in the board in order to define an area of contact.

13. The educational game of claim 12, in which the flat leads are arranged on either side of a thin insulating support provided within N openings arranged in order to corresond to the N recesses in the board.

* * * * *